(No Model.)
E. M. BALLANTINE.
TIRE FOR BICYCLES.
No. 522,141. Patented June 26, 1894.
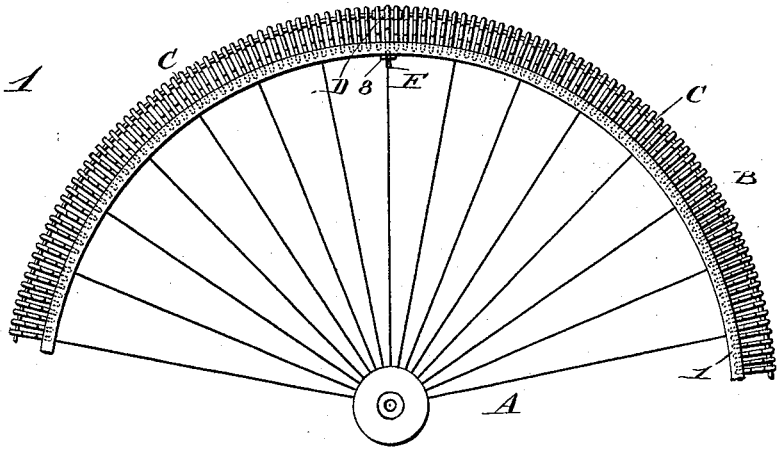
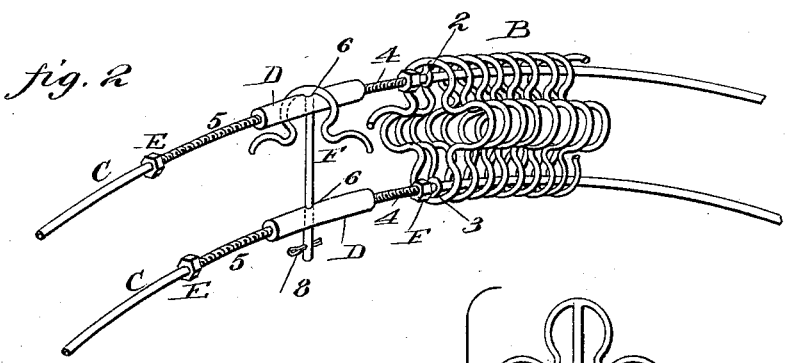
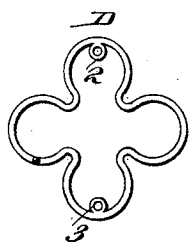
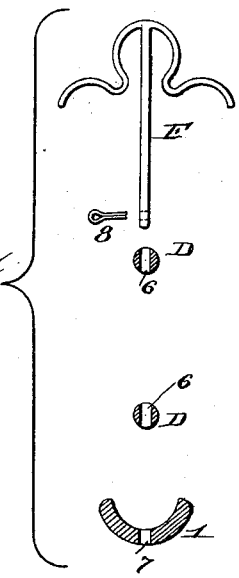
Witnesses.
Inventor.
Eden M Ballantine
By S. C. Fitzgerald
Att'y

UNITED STATES PATENT OFFICE.

EDEN MILTON BALLANTINE, OF PHILADELPHIA, PENNSYLVANIA.

TIRE FOR BICYCLES.

SPECIFICATION forming part of Letters Patent No. 522,141, dated June 26, 1894.

Application filed January 17, 1894. Serial No. 497,189. (No model.)

*To all whom it may concern:*

Be it known that I, EDEN MILTON BALLANTINE, a citizen of the United States, residing at Philadelphia, in the county of Philadelphia and State of Pennsylvania, have invented certain new and useful Improvements in Tires for Bicycles; and I do hereby declare the following to be a full, clear, and exact description of the invention, such as will enable others skilled in the art to which it appertains to make and use the same.

My invention relates to an improvement in flexible tires for bicycles, or other vehicles.

The invention will first be described in connection with the accompanying drawings, and then particularly pointed out in the claims.

In the drawings—Figure 1 is a side elevation of a bicycle-wheel provided with a tire embodying my invention. Fig. 2 is a perspective view of a short portion of the tire, showing also the fastening device. Fig. 3 is a cross section of the tire. Fig. 4 is a detail view showing the fastening device and key taken apart.

Referring to the drawings, A is a wheel having the usual rim 1 in which is placed a tire. B. This tire consists of a helix of spring wire or spring steel tape each coil having the shape, in cross section of a quarter-foil as will be seen in Fig. 3. The coils are preferably placed almost but not entirely in contact with each other, and some of the coils, at suitable intervals, are provided each with a loop or eye as shown at 2, these eyes being formed either integral with the coils, by bending the latter, or may consist of separate rings each brazed or otherwise secured to the inner surface of its respective coil. A similar series of rings or eyes is provided on the opposite side of the coils as shown at 3. Through both sets of loops 2 and 3 are passed the draw-bands C which consist, preferably, of round rods of flexible metal and threaded at their ends, one end of each wire being provided with a left hand thread as shown at 4 and the other end having a right hand thread 5. Onto these threaded ends of each draw-band C is placed a turn-buckle or internally threaded sleeve D which has left and right-hand threads. By turning these turn-buckles, the draw-bands may be pulled tight and the tire thereby clamped to its place on the rim. A nut E is secured onto each end of each draw-band as shown until it engages the first loop or eye, 2 and 3, of the coil nearest the joint, thus compressing the helix to permit the tire to be easily put in place or removed. The turn-buckles are each provided with central slots 6 and the rim or felly has a similar slot, 7, all of these slots being brought into register when the tire is put in place. A key F having a head shaped as shown in Fig. 4 is passed through the slots, being held from withdrawal by a spring colter 8 which passes through an eye 9 in the inner end of the key F. It will be plain that by my construction the tire may be reversed when the outer side of the coil becomes worn, thus presenting a new wearing surface.

Any suitable method of manufacture may be employed in manufacturing the tire, such for instance as first making the helix with circular coils into the desired quarter-foil shape in dies, the helix being then tempered.

Having thus fully described my invention, what I claim as new, and desire to secure by Letters Patent, is—

1. In a bicycle or the like, the combination with a tire composed of a wire coiled to a quarter-foliate form one or several of the convolutions of which is provided with loops projecting centrally from its opposite foils, of two draw-bands passed through said loops inside the tire, substantially as and for the purpose set forth.

2. In a bicycle, the combination with a wheel having a slot in its felly, of a tire composed of a helix of spring wire provided with two sets of loops, a draw-band passing through each set of loops, a turn-buckle for each draw-band, into which the draw-bands are threaded, each turn-buckle being slotted, a key passing through both slots in the turn-buckles and in the felly a colter passing through the end of the key inside the felly of the wheel, substantially as described.

In testimony whereof I affix my signature in presence of two witnesses.

EDEN MILTON BALLANTINE.

Witnesses:
 CHAS. M. BALLANTINE,
 WALTER M. LEWIS.